United States Patent

Holz et al.

[15] 3,683,364

[45] Aug. 8, 1972

[54] DISPLAY PANEL WHEREIN EACH SCANNING CELL IS ASSOCIATED WITH A PLURALITY OF DISPLAY CELLS

[72] Inventors: George E. Holz, North Plainfield, N.J.; James A. Ogle, Paoli, Pa.

[73] Assignee: Burroughs Corporation

[22] Filed: Jan. 18, 1971

[21] Appl. No.: 107,131

[52] U.S. Cl...........340/324 R, 313/220, 315/169 TV

[51] Int. Cl...............................................H01j 17/16

[58] Field of Search.........340/324 R, 166 R, 166 EL; 313/210, 220, 109.5; 315/84.6, 169 R, 169 TV

[56] References Cited

UNITED STATES PATENTS 2,847,615 8/1958 Engelbart................315/84.6

3,509,408 4/1970 Holz.........................313/220

3,513,327 5/1970 Johnson .............315/169 TV

*Primary Examiner*—John W. Caldwell

*Assistant Examiner*—Marshall M. Curtis

*Attorney*—Kenneth L. Miller, Robert A. Green, George L. Kensinger and Charles S. Hall

[57] ABSTRACT

A display panel includes a layer of scanning cells, each including a scanning anode and a scanning cathode, and a layer of display cells arrayed adjacent to the layer of scanning cells so that the scanning cells communicate with and are sources of excited particles for the display cells. According to the invention, the cells and electrodes are arrayed so that each scanning cell communicates with and provides excited particles for more than one display cell.

10 Claims, 2 Drawing Figures

INVENTORS
GEORGE E. HOLZ
JAMES A. OGLE
BY
Robert A. Green
ATTORNEY

INVENTOR.
GEORGE E. HOLZ
JAMES A. OGLE

DISPLAY PANEL WHEREIN EACH SCANNING CELL IS ASSOCIATED WITH A PLURALITY OF DISPLAY CELLS

BACKGROUND OF THE INVENTION

One type of display panel which has recently become commercially available is known as a SELF-SCAN panel. This type panel is described and claimed in copending application Ser. No. 850,984, filed Aug. 18, 1969, and includes an array of scanning anodes and scanning cathodes oriented at 90° to each other to form rows and columns of scanning cells. The panel also includes a layer of display cells arrayed in rows and columns and having one display cell for each scanning cell. This type of panel has been built and operated successfully. However, for some applications, these panels must be made in such extremely small size and with such small-diameter, closely spaced cells, that the presently-known panel structure is not completely satisfactory.

SUMMARY OF THE INVENTION

Briefly, the invention comprises arraying the various support plates and electrodes of a SELF-SCAN panel so that each scanning cell can operate in conjunction with at least two display cells.

DESCRIPTION OF THE PREFERRED EMBODIMENTS

Figure 1:
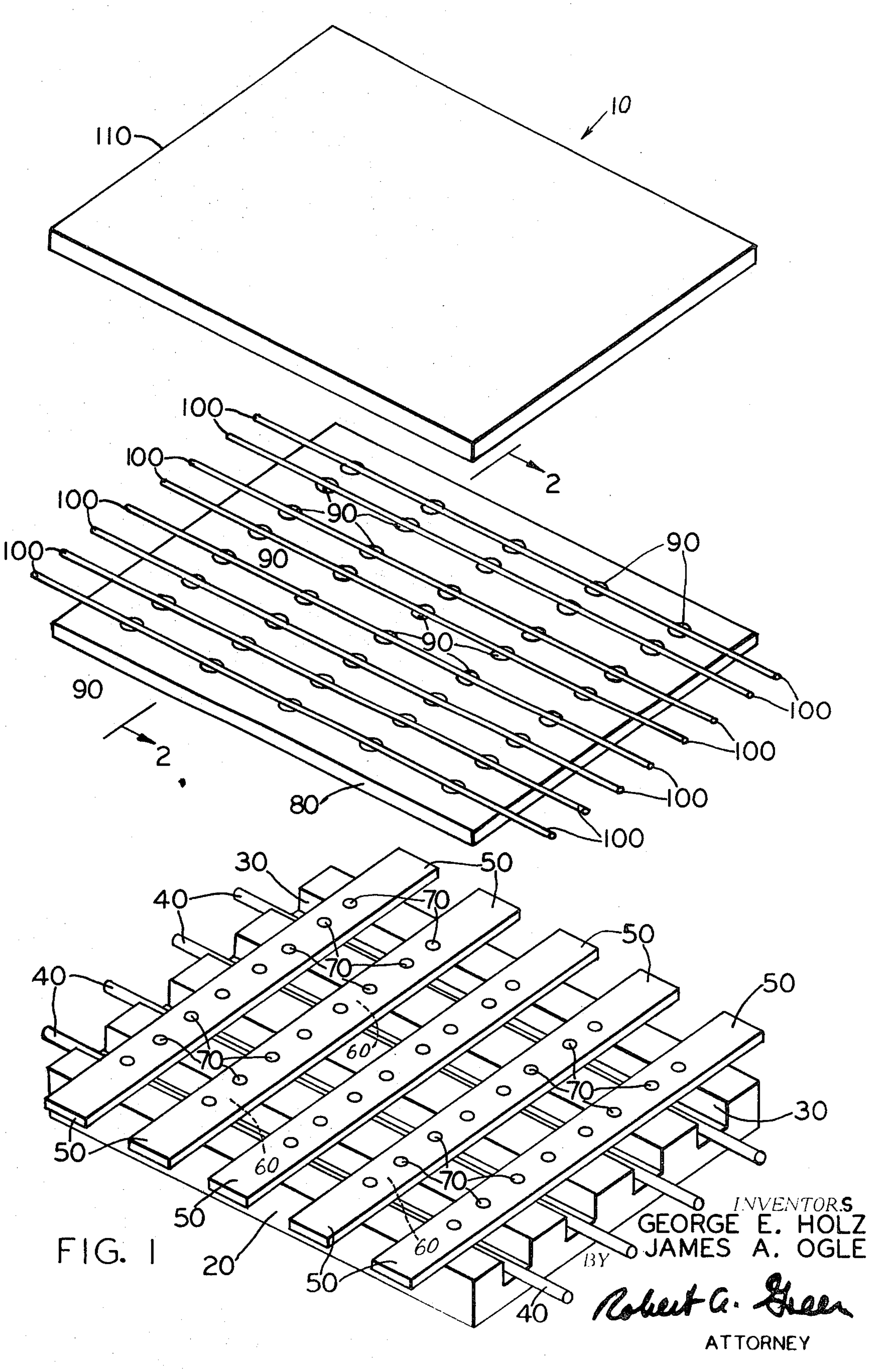
FIG. 1 is a perspective exploded view of a display panel embodying the invention.

A display panel 10 embodying the invention includes a base plate 20 of insulating material such as glass, ceramic, or the like having a plurality of parallel slots 30 formed in the top surface thereof. An electrode 40 known as a scanning anode, and preferably a wire, is seated in each of the slots and an array of electrodes 50 known as scanning cathodes, and preperably metallic strips, are seated on the top surface of the base plate. The cathodes 50 are oriented at 90° to the anodes so that each cathode crosses each anode and each crossing defines a gas-filled cell 60 known as a scanning cell. The portion of each cathode associated with each slot is provided with a pair of spaced-apart holes 70 which communicate with the associated slot. The holes 70 of each cathode are preferably disposed in a line along the axis of the cathode.

An insulating plate 80 of glass, ceramic, or the like is seated on the cathodes 50 and is provided with a plurality of rows and columns of apertures or cells 90 which comprise display cells, each of which is positioned in operative relation with one of the apertures or holes 70 in the cathodes 50. Thus, each scanning cell 60 communicates through the two associated cathode holes 70 with two display cells. An array of electrodes 100 used as display anodes are disposed on the top surface of the insulating plate 80, with each anode being aligned with and in operative relation with a row of display cells. The electrodes 100 are preferably wires.

It is to be understood that the cathode electrodes 50 and display anodes 100 may be seated in slots or depressions in the plates between which they are positioned.

Panel 10 is completed by a glass cover plate 110, and all of the plates and electrodes are suitably secured together by a seal 120 (FIG. 2) formed of a glass frit or the like.

The panel 10 may also include any suitable ionizable gas such as neon, argon, xenon, etc., singly or in combination, with a vapor of a metal such as mercury included in the gas to minimize cathode sputtering. The gas used is preferably a Penning mixture in which the gases of the mixture have related energy levels such that the metastable atoms of one gas produce ions of the other gas. Neon and xenon comprise a particularly effective Penning mixture. The gas may be selected from a wide range of pressures, e.g., between about 100 and 250 torr, with a particularly suitable pressure being about 175 torr. The gas may be introduced into panel 10 through a tubulation 130.

The operation of a display panel of the type described herein is set forth in detail in the aforementioned copending application. Briefly, the operation comprise applying operating potential to all of the scanning anodes 40 and simultaneously applying operating potential to each of the scanning cathodes 50 in turn, beginning with the first, say, at the left-hand end of the panel, continuing to the right, and continuously cycling the scanning cells in this way. As operating potentials are applied, each column of scanning cells 60 fires in turn, with the transfer of glow from one column to the next being facilitated by the slots 30 which permit excited particles diffuse from a column of ON scanning cells to the adjacent column which are primed thereby. As is well known in the art, it may be necessary to provide some means for providing first electrons and thus facilitating the starting of the scanning operation. For example, an auxiliary gas cell (not shown) may be provided and held ON continually at a low level to act as a source of electrons or other excited particles.

Figure 2:
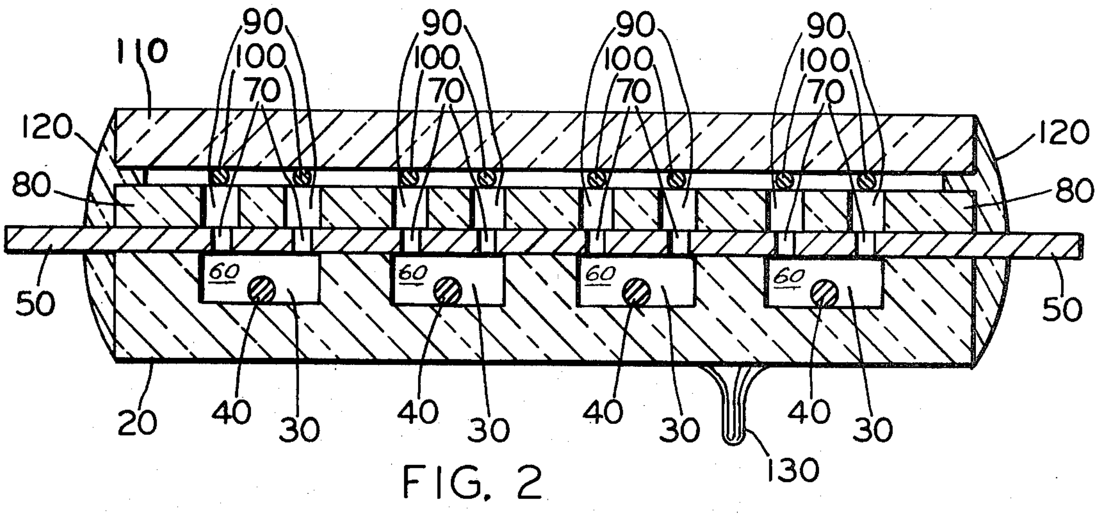
FIG. 2 is a sectional view, along the line 2—2 in FIG. 1, showing the panel assembled.

If, as each column of scanning cells is fired, control or information signals are applied to one or more of the display anodes 100, the glow is transferred from the associated scanning cell 60 into the display cell 90 associated with the appropriately energized display anode. As can be seen in FIG. 2, if, for example, both display anodes 100X associated with the scanning anode 40X are energized, then both associated display cells 90X are turned on and glow. This operation is facilitated by the diffusion of excited particles from the scanning cell through the cathode holes into the associated display cells.

If appropriate information signals are applied to the display anodes as each column of scanning cells is fired, then the proper associated display cells are fired, and, if this cycling operation is carried out from left to right at a suitable rate, then a stationary but changeable message can be displayed in the display cells and can be seen by a viewer.

It can be seen that, since the panel 10 can use a single scanning cell to energize two display cells, a simplified, more economical panel structure is achieved and smaller panels may be built than with prior art arrangements in which each scanning cell was associated with a single display cell. It can also be seen that, with proper dimensioning of the various slots and electrodes, more than two display cells can be provided in communication with each scanning cell.

What is claimed is:

1. A display panel comprising a gas-filled envelope and including in said envelope a plurality of first cells arrayed in rows and columns and each including a first electrode and a second electrode for receiving potentials for use in ionizing and firing said cells, said first cells being arrayed in a layer and comprising sources of excited particles when ionized, a plurality of second display cells arrayed in rows and columns and each including a third electrode and a portion of one of said second electrodes as its operating electrodes, said second display cells being arrayed in a layer adjacent to said layer of first cells and in gas communication therewith, said second electrodes being disposed between said first cells and said second cells and dimensioned to permit gas communication therebetween, each first cell communicating with a plurality of said second cells through said second electrodes whereby, when one of said first cells is fired by means of operating potentials applied to its first electrode and second electrode, one or more of the associated display cells can be fired by potentials applied simultaneously to the associated third electrodes.

2. The panel defined in claim 1 wherein each said first electrode is an anode electrode, each said second electrode is a cathode electrode, and each said third electrode is an anode electrode.

3. The panel defined in claim 2 wherein each cathode electrode is a generally flat strip having a series of apertures, each aperture providing gas communication between a first cell and a second cell.

4. The panel defined in claim 2 wherein each cathode electrode is a generally flat strip having a series of apertures, each aperture providing gas communication between a first cell and a second cell, each first cell communicating through apertures in the associated cathode with a plurality of second cells.

5. The panel defined in claim 2 wherein each first anode electrode is in operative relation with a plurality of said first cells, each cathode electrode is in operative relation with a plurality of said first cells and said second display cells, and each second anode electrode is in operative relation with a plurality of said second display cells.

6. The panel defined in claim 2 wherein said first cells and said second cells are arrayed in rows and columns, each first anode electrode is in operative relation with a row of said first cells, each cathode electrode is in operative relation with a column of said first cells and said second display cells, and each second anode electrode is in operative relation with a row of said second display cells.

7. A display panel as defined in claim 2 wherein said first cells are arrayed in rows and columns, said first anodes are elongated electrodes, each in operative relation with a row of said first cells, said cathode electrodes are elongated electrodes, each in operative relation with a column of said first cells, said second display cells are arrayed in rows and columns, there being two rows of such second cells positioned in operative relation with each row of first cells, said second anode electrodes each being in operative relation with one row of said second cells, each cathode electrode having an aperture in communication with each associated second display cell for providing communication between each first cell and the two display cells associated therewith.

8. A display panel comprising a gas-filled envelope including a base plate of insulating material having a plurality of slots formed in the top surface thereof, a first anode electrode seated in each of said slots, a plurality of cathode electrodes seated on said top surface of said base plate and oriented at 90° to said anode electrodes, each cathode electrode crossing each first anode electrode, each crossing defining a scanning gas cell, each cathode having a series of apertures extending along its length, a second insulating plate seated on said first plate and having a plurality of rows and columns of display cells, there being a plurality of rows of display cells associated with each slot in said base plate and each row of scanning cells, whereby each column of display cells is arranged in groups, each group being associated with one scanning cell, each cathode and its series of apertures being aligned with a column of said display cells, and each scanning cell being in gas communication with a group of display cells in each column of display cells through the apertures in the associated cathode electrode, and an insulating viewing plate seated on said second insulating plate.

9. The panel defined in claim 8 wherein there are two rows of display cells associated with each row of scanning cells, and each cathode has two separate holes providing communication between each scanning cell and each of the two associated display cells.

10. The panel defined in claim 8 wherein said two separate cathode holes have diameters of the order of 3 to 5 mils.

* * * * *